US011535386B2

(12) United States Patent
Beauchesne-Martel et al.

(10) Patent No.: US 11,535,386 B2
(45) Date of Patent: Dec. 27, 2022

(54) SYSTEM AND METHOD FOR OPERATING A MULTI-ENGINE ROTORCRAFT FOR ICE ACCRETION SHEDDING

(71) Applicant: PRATT & WHITNEY CANADA CORP., Longueuil (CA)

(72) Inventors: Philippe Beauchesne-Martel, Brossard (CA); Mark Cunningham, Montreal-West (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 656 days.

(21) Appl. No.: 16/671,551

(22) Filed: Nov. 1, 2019

(65) Prior Publication Data

US 2020/0391873 A1 Dec. 17, 2020

Related U.S. Application Data

(60) Provisional application No. 62/862,582, filed on Jun. 17, 2019.

(51) Int. Cl.
| | |
|---|---|
| *G01C 23/00* | (2006.01) |
| *B64D 15/16* | (2006.01) |
| *B64C 27/00* | (2006.01) |
| *B64D 15/20* | (2006.01) |
| *F02C 6/02* | (2006.01) |

(Continued)

(52) U.S. Cl.
CPC .............. *B64D 15/16* (2013.01); *B64C 27/00* (2013.01); *B64D 15/20* (2013.01); *F02C 6/02* (2013.01); *F02C 6/206* (2013.01); *F02C 9/22* (2013.01); *F02C 9/26* (2013.01); *B64C 27/06* (2013.01); *B64D 27/10* (2013.01); *B64D 31/14* (2013.01); *F05D 2220/329* (2013.01); *F05D 2220/74* (2013.01); *F05D 2270/09* (2013.01); *F05D 2270/13* (2013.01); *F05D 2270/80* (2013.01)

(58) Field of Classification Search
CPC ........ B64D 15/16; B64D 15/20; B64D 27/10; B64D 31/14; B64C 27/00; B64C 27/06; F02C 6/02; F02C 6/206; F02C 9/22; F02C 9/26; F05D 2220/329; F05D 2220/74; F05D 2270/09; F05D 2270/13; F05D 2270/80
See application file for complete search history.

(56) References Cited

U.S. PATENT DOCUMENTS

| | | |
|---|---|---|
| 4,131,250 A | 12/1978 | Binckley |
| 4,292,502 A | 9/1981 | Adams |

(Continued)

OTHER PUBLICATIONS

US 9,951,691, 4/2018, (withdrawn).

*Primary Examiner* — Adam M Alharbi
(74) *Attorney, Agent, or Firm* — Norton Rose Fulbright Canada LLP

(57) ABSTRACT

There is provided a system and a method for operating a multi-engine rotorcraft. When the rotorcraft is cruising in an asymmetric operating regime (AOR) at least one engine is an active engine and is operated in an active mode to provide motive power to the rotorcraft and at least one second engine is a standby engine and is operated in a standby mode to provide substantially no motive power to the rotorcraft, at least one of a power level of the at least one second engine is increased and at least one variable geometry mechanism of the at least one second engine is moved to shed any ice accumulation on the at least one second engine.

22 Claims, 8 Drawing Sheets

(51) Int. Cl.
*F02C 6/20* (2006.01)
*F02C 9/22* (2006.01)
*F02C 9/26* (2006.01)
*B64C 27/06* (2006.01)
*B64D 27/10* (2006.01)
*B64D 31/14* (2006.01)

(56) References Cited

U.S. PATENT DOCUMENTS

| | | |
|---|---|---|
| 4,526,031 A | 7/1985 | Weisend, Jr. et al. |
| 5,697,394 A | 12/1997 | Smith et al. |
| 6,330,986 B1 | 12/2001 | Rutherford et al. |
| 7,874,161 B2 | 1/2011 | Wiliams |
| 8,550,402 B2 | 10/2013 | Houlihan et al. |
| 9,062,421 B2 | 6/2015 | Brand |
| 9,133,773 B2 | 9/2015 | Gould et al. |
| 9,194,285 B2 | 11/2015 | Botti et al. |
| 9,239,011 B2 | 1/2016 | Jones |
| 10,099,791 B2 | 10/2018 | Borigo et al. |
| 10,100,732 B2 | 10/2018 | Ward et al. |
| 10,113,444 B2 | 10/2018 | Huang et al. |
| 10,184,405 B1 | 1/2019 | Veres et al. |
| 2008/0257033 A1 | 10/2008 | Roberts |
| 2009/0090814 A1* | 4/2009 | Barbara ............ B64D 15/16 244/134 B |
| 2013/0219905 A1 | 8/2013 | Marconi et al. |
| 2017/0074175 A1 | 3/2017 | Uyama et al. |
| 2017/0174349 A1* | 6/2017 | Povroznik, III ....... B64D 15/20 |
| 2018/0045116 A1 | 2/2018 | Schenk |
| 2018/0201386 A1 | 7/2018 | Strauss et al. |

\* cited by examiner

SYSTEM AND METHOD FOR OPERATING A MULTI-ENGINE ROTORCRAFT FOR ICE ACCRETION SHEDDING

CROSS REFERENCE TO RELATED APPLICATIONS

This patent application claims priority of U.S. provisional Application Ser. No. 62/862,582, filed on Jun. 17, 2019, the entire contents of which are hereby incorporated by reference.

TECHNICAL FIELD

The present disclosure relates generally to a multi-power plant engine system, and more specifically to operating a multi-engine rotorcraft for ice accretion shedding.

BACKGROUND OF THE ART

When operating aircraft (e.g., rotorcraft) with multiple engines, there may be certain portions of a mission that do not require both engines to be operating at full power. In cruising conditions, operating a single engine at a relatively high power, instead of multiple engines at lower power, may allow for better fuel efficiency. For example, one or more engine(s) are operated at high power, and one or more remaining engine(s) are operated in what is sometimes referred to as a "standby" mode. However, under cold weather, such a mode of operation can be favorable to ice accretion and snow build-up on the variable geometry mechanisms of the standby engine, leading to degraded performance, increased operating temperatures, or potential engine compressor surges.

Therefore, improvements are needed.

SUMMARY

In accordance with a broad aspect, there is provided a method for operating a multi-engine rotorcraft, the method comprising, when the rotorcraft is cruising in an asymmetric operating regime (AOR) in which at least one engine is an active engine and is operated in an active mode to provide motive power to the rotorcraft and at least one second engine is a standby engine and is operated in a standby mode to provide substantially no motive power to the rotorcraft, at least one of increasing a power level of the at least one second engine and moving at least one variable geometry mechanism of the at least one second engine to shed any ice accumulation on the at least one second engine.

In some embodiments, the method further comprises determining whether one or more conditions are present in which the ice accumulation on the at least one second engine is possible.

In some embodiments, determining whether the one or more conditions are present is performed on the basis of outside air temperature.

In some embodiments, determining whether the one or more conditions are present is further performed on the basis of at least one of a power level of the at least one second engine, an inlet temperature of the at least one second engine, an angle of at least one variable guide of the at least one second engine, a mass flow of the at least one second engine, a core corrected speed of the at least one second engine, ambient pressure, airspeed, and an altitude of the rotorcraft.

In some embodiments, determining whether the one or more conditions are present is performed on the basis of measurement data received from at least one icing sensor provided on the rotorcraft.

In some embodiments, determining whether the one or more conditions are present comprises receiving measurement data from at least one pressure sensor provided on the at least one second engine, comparing the measurement data to a predetermined threshold, and responsive to determining that the measurement data exceeds the threshold, determining that the ice accumulation is possible.

In some embodiments, determining whether the one or more conditions are present is performed on the basis of measurement data received from a pressure differential sensor configured to measure pressure at a protection grid provided at an inlet of the second engine.

In some embodiments, determining whether the one or more conditions are present is performed on the basis of measurement data received from a pressure differential sensor configured to measure pressure on either side of a plurality of inlet guide vanes of the second engine.

In some embodiments, determining whether the one or more conditions are present is performed on the basis of input data received from at least one thermodynamic indicator provided on the rotorcraft.

In some embodiments, determining whether the one or more conditions are present is performed on the basis of input data acquired from at least one operator input.

In some embodiments, increasing the power level of the at least one second engine comprises increasing a fuel flow to the at least one second engine.

In some embodiments, moving the at least one variable geometry mechanism of the at least one second engine comprises opening a plurality of variable inlet guide vanes of the at least one second engine.

In some embodiments, moving the at least one variable geometry mechanism of the at least one second engine comprises opening a plurality of handling bleed-off valves of the at least one second engine.

In some embodiments, the at least one of increasing the power level of the at least one second engine and moving the at least one variable geometry mechanism of the at least one second engine is performed periodically.

In some embodiments, the at least one of increasing the power level of the at least one second engine and moving the at least one variable geometry mechanism of the at least one second engine is performed in a single occurrence.

In accordance with another broad aspect, there is provided a system for operating a multi-engine rotorcraft, comprising a processing unit and a non-transitory computer-readable medium having stored thereon program instructions executable by the processing unit for, when the rotorcraft is cruising in an asymmetric operating regime (AOR) in which at least one engine is an active engine and is operated in an active mode to provide motive power to the rotorcraft and at least one second engine is a standby engine and is operated in a standby mode to provide substantially no motive power to the rotorcraft, at least one of increasing a power level of the at least one standby engine and moving at least one variable geometry mechanism of the at least one second engine to shed any ice accumulation on the at least one second engine.

In some embodiments, the program instructions are executable by the processing unit for determining whether one or more conditions are present in which the ice accumulation on the at least one second engine is possible.

In some embodiments, the program instructions are executable by the processing unit for determining whether the one or more conditions are present on the basis of outside air temperature.

In some embodiments, the program instructions are executable by the processing unit for determining whether the one or more conditions are present on the basis of at least one of a power level of the at least one second engine, an inlet temperature of the at least one second engine, an angle of at least one variable guide of the at least one second engine, a mass flow of the at least one second engine, a core corrected speed of the at least one second engine, ambient pressure, airspeed, and an altitude of the rotorcraft.

In some embodiments, the program instructions are executable by the processing unit for determining whether the one or more conditions are present comprising receiving measurement data from a pressure differential sensor provided on the at least one second engine, the pressure differential sensor configured to measure pressure on either side of a plurality of inlet guide vanes of the second engine, comparing the measurement data to a predetermined threshold, and responsive to determining that the measurement data exceeds the threshold, determining that the ice accumulation is possible.

In some embodiments, the program instructions are executable by the processing unit for determining whether the one or more conditions are present comprising receiving measurement data from a pressure differential sensor provided on the at least one second engine, the pressure differential sensor configured to measure pressure at a protection grid provided at an inlet of the second engine, comparing the measurement data to a predetermined threshold, and responsive to determining that the measurement data exceeds the threshold, determining that the ice accumulation is possible.

In some embodiments, the program instructions are executable by the processing unit for outputting at least one control signal comprising instructions for at least one of increasing a fuel flow to the at least one second engine to increase the power level of the at least one second engine and opening a plurality of variable inlet guide vanes of the at least one second engine.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There are described herein methods and systems for operating an aircraft, such as a rotorcraft. Under certain conditions, it can be desirable to operate an aircraft in a so-called "asymmetric operating regime" (AOR), which is described in greater detail herein below. When the aircraft is cruising in the AOR, multiple engines of the aircraft, which may be a multi-engine helicopter or other rotorcraft, are operated at different output power levels.

Figure 1A:
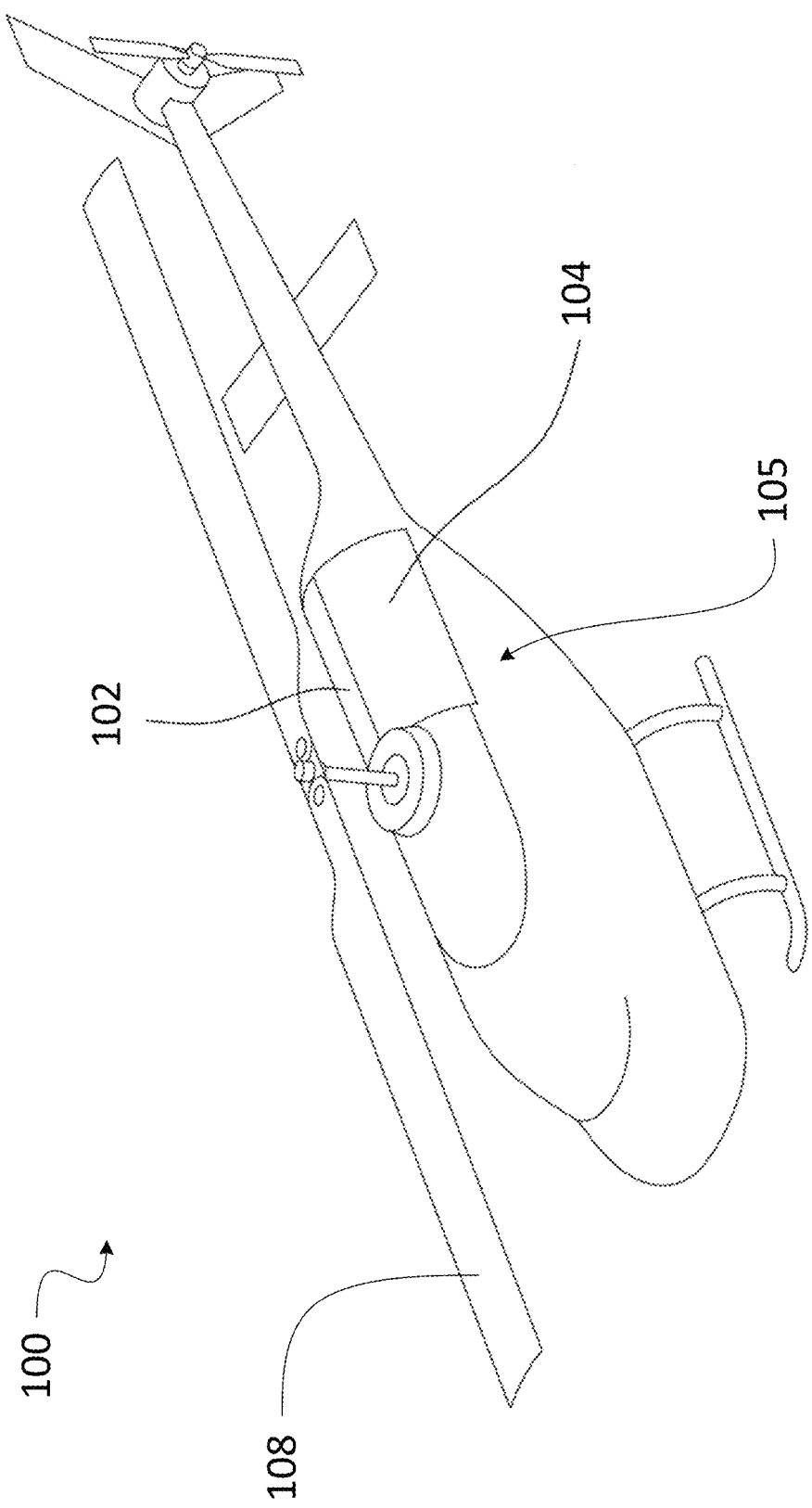
FIG. 1A is a schematic view of a multi-engine rotorcraft, in accordance with one embodiment.

FIG. 1A depicts an exemplary multi-engine rotorcraft 100, which in this case is a helicopter. The rotorcraft 100 includes at least two gas turbine engines 102, 104. These two engines 102, 104 may be interconnected, in the case of the depicted helicopter application, to a transmission clutch system (TCS) 105, as shown in FIG. 1B, to drive a main rotor 108.

Figure 1B:
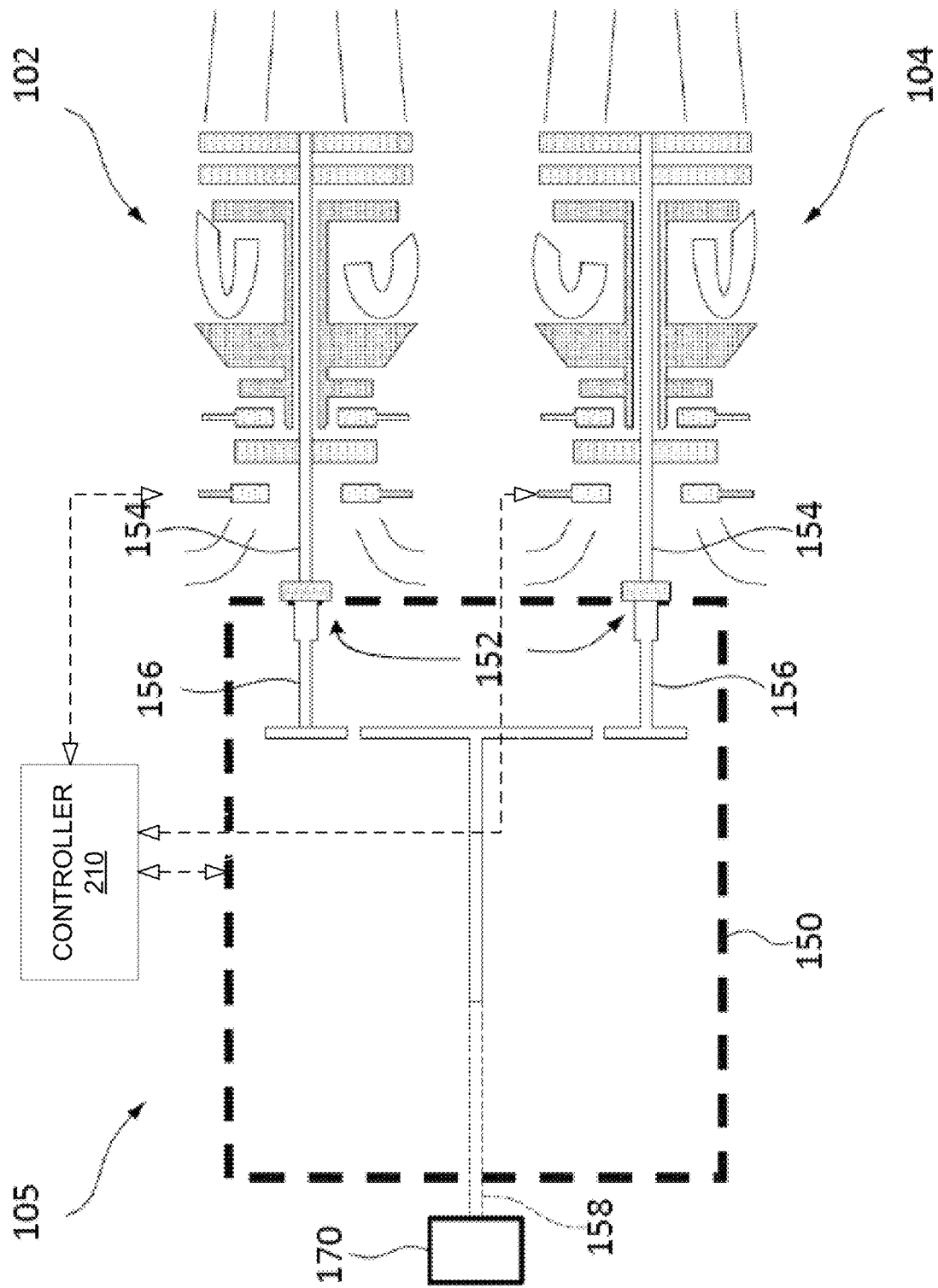
FIG. 1B is a schematic representation of an exemplary multi-engine system for the rotorcraft of FIG. 1A, showing axial cross-sectional views of two gas turbine engines, in accordance with one embodiment.

Turning now to FIG. 1B, illustrated is an exemplary multi-engine system 105 that may be used as a power plant for an aircraft, including but not limited to a rotorcraft such as a helicopter. The multi-engine system 105 may include two or more gas turbine engines 102, 104. In the case of a helicopter application, these gas turbine engines 102, 104 will be turboshaft engines. Control of the multi-engine system 105 is effected by one or more controller(s) 210, which may be FADEC(s), electronic engine controller(s) (EEC(s)), or the like, that are programmed to manage the operation of the engines 102, 104 to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system 105. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft conditions (cruise speed and altitude) are substantially stable, the engines 102, 104 of the system 105 may be operated asymmetrically, with one engine operated in a high-power "active" mode and the other engine operated in a lower-power (which could be no power, in some cases) "standby" mode. Doing so may provide fuel saving opportunities to the aircraft, however there may be other suitable reasons why the engines are desired to be operated asymmetrically. This operation management may therefore be referred to as an "asymmetric mode" or an "asymmetric operating regime" (AOR), wherein one of the two engines is operated in a lower-power (which could be no power, in some cases) "standby mode" while the other engine is operated in a high-power "active" mode. Such an asymmetric operation may be engaged for a cruise phase of flight (continuous, steady-state flight which is typically at a given commanded constant aircraft cruising speed and altitude). The multi-engine system 105 may be used in an aircraft, such as a helicopter, but also has applications in suitable marine and/or industrial applications or other ground operations.

Referring still to FIG. 1B, according to the present description, the multi-engine system 105 is driving in this example a helicopter which may be operated in the AOR, in which a first of the engines (say, 102) may be operated at high power in an active mode and the second of the engines (104 in this example) may be operated in a lower-power (which could be no power, in some cases) standby mode. In one example, the first engine 102 may be controlled by the controller(s) 210 to run at full (or near-full) power conditions in the active mode, to supply substantially all or all of a required power and/or speed demand of a common load 170. The second engine 104 may be controlled by the controller(s) 210 to operate at lower-power or no-output-power conditions to supply substantially none or none of a required power and/or speed demand of the common load 170. Optionally, a clutch may be provided to declutch the low-power engine. Controller(s) 210 may control the engine's governing on power according to an appropriate schedule or control regime. The controller(s) 210 may comprise a first controller for controlling the first engine 102 and a second controller for controlling the second engine 104. The first controller and the second controller may be in communication with each other in order to implement the operations described herein. In some embodiments, a single controller 210 may be used for controlling the first engine 102 and the second engine 104.

In another example, an AOR of the engines may be achieved through the one or more controller's 210 differential control of fuel flow to the engines, as described in pending application Ser. No. 16/535,256, the entire contents of which are incorporated herein by reference. Low fuel flow may also include zero fuel flow in some examples.

Although various differential control between the engines of the engine system 105 are possible, in one particular embodiment the controller(s) 210 may correspondingly control fuel flow rate to each engine 102, 104 accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the AOR, the standby engine may be maintained between 70% and 99.5% less than the fuel flow to the active engine. In some embodiments, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 210 may operate one engine (say 102) of the multiengine system 105 in a standby mode at a power substantially lower than a rated cruise power level of the engine, and in some embodiments at substantially zero output power and in other embodiments less than 10% output power relative to a reference power (provided at a reference fuel flow). Alternately still, in some embodiments, the controller(s) 210 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system 105 of FIG. 1B may be operated in an AOR by control of the relative speed of the engines using controller(s) 210, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the AOR, such as control based on a target pressure ratio, or other suitable control parameters.

Although the examples described herein illustrate two engines, the AOR is applicable to more than two engines, whereby at least one of the multiple engines is operated in a low-power standby mode while the remaining engines are operated in the active mode to supply all or substantially all of a required power and/or speed demand of a common load.

In use, the first engine (say 102) may operate in the active mode while the other engine (say 104) may operate in the standby mode, as described above. During the AOR, if the helicopter needs a power increase (expected or otherwise), the second engine 104 may be required to provide more power relative to the low power conditions of the standby mode, and possibly return immediately to a high- or full-power condition. This may occur, for example, in an emergency condition of the multi-engine system 105 powering the helicopter, wherein the "active" engine loses power, and the power recovery from the lower power to the high power may take some time. Even absent an emergency, it will be desirable to repower the standby engine to exit the AOR.

In some embodiments, the standby engine may be declutched from the TCS 105 of the rotorcraft. As illustrated in FIG. 1B, first and second engines 102, 104 each having a respective transmission 152 are interconnected by a common output gearbox 150 to drive the common load 170. In one embodiment, the common load 170 may comprise a rotary wing of a rotary-wing aircraft. For example, the common load 170 may be a main rotor 108 of the rotorcraft 100. Depending on the type of the common load 170 and on the operating speed thereof, each of engines 102, 104 may be drivingly coupled to the common load 170 via the output gearbox 150, which may be of the speed-reduction type.

For example, the gearbox 150 may have a plurality of transmission shafts 156 to receive mechanical energy from respective output shafts 154 of respective turboshaft engines 102, 104. The gearbox 150 may be configured to direct at least some of the combined mechanical energy from the plurality of the turboshaft engines 102, 104 toward a common output shaft 158 for driving the common load 170 at a suitable operating (e.g., rotational) speed. It is understood that the multi-engine system 105 may also be configured, for example, to drive accessories and/or other elements of an associated aircraft. As will be described, the gearbox 150 may be configured to permit the common load 170 to be driven by either of the turboshaft engines 102, 104 or, by a combination of both engines 102, 104 together.

Figure 2:
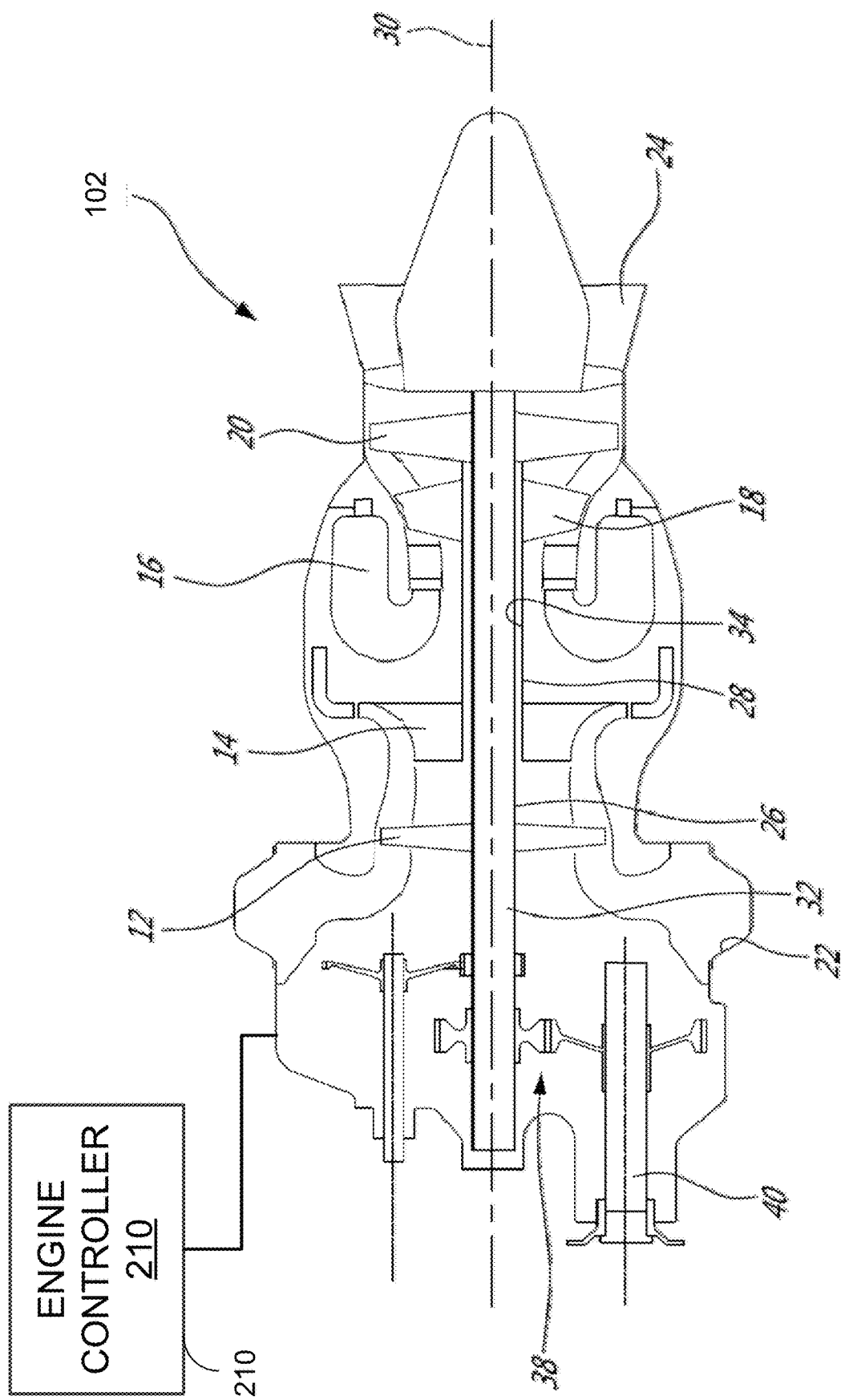
FIG. 2 is a cross-sectional view of an example turboshaft engine of the rotorcraft of FIG. 1, in accordance with one embodiment.

With reference to FIG. 2, the gas turbine engines 102, 104 can be embodied as turboshaft engines. Although the foregoing discussion relates to engine 102, it should be understood that engine 104 can be substantively similar to engine 104. In this example, the engine 102 is a turboshaft engine generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 102 has multiple, i.e. two or more, spools which may perform the compression to pressurize the air received through an air inlet 22, and which extract energy from the combustion gases before they exit via an exhaust outlet 24. In the illustrated embodiment, the engine 102 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

Figure 3A:
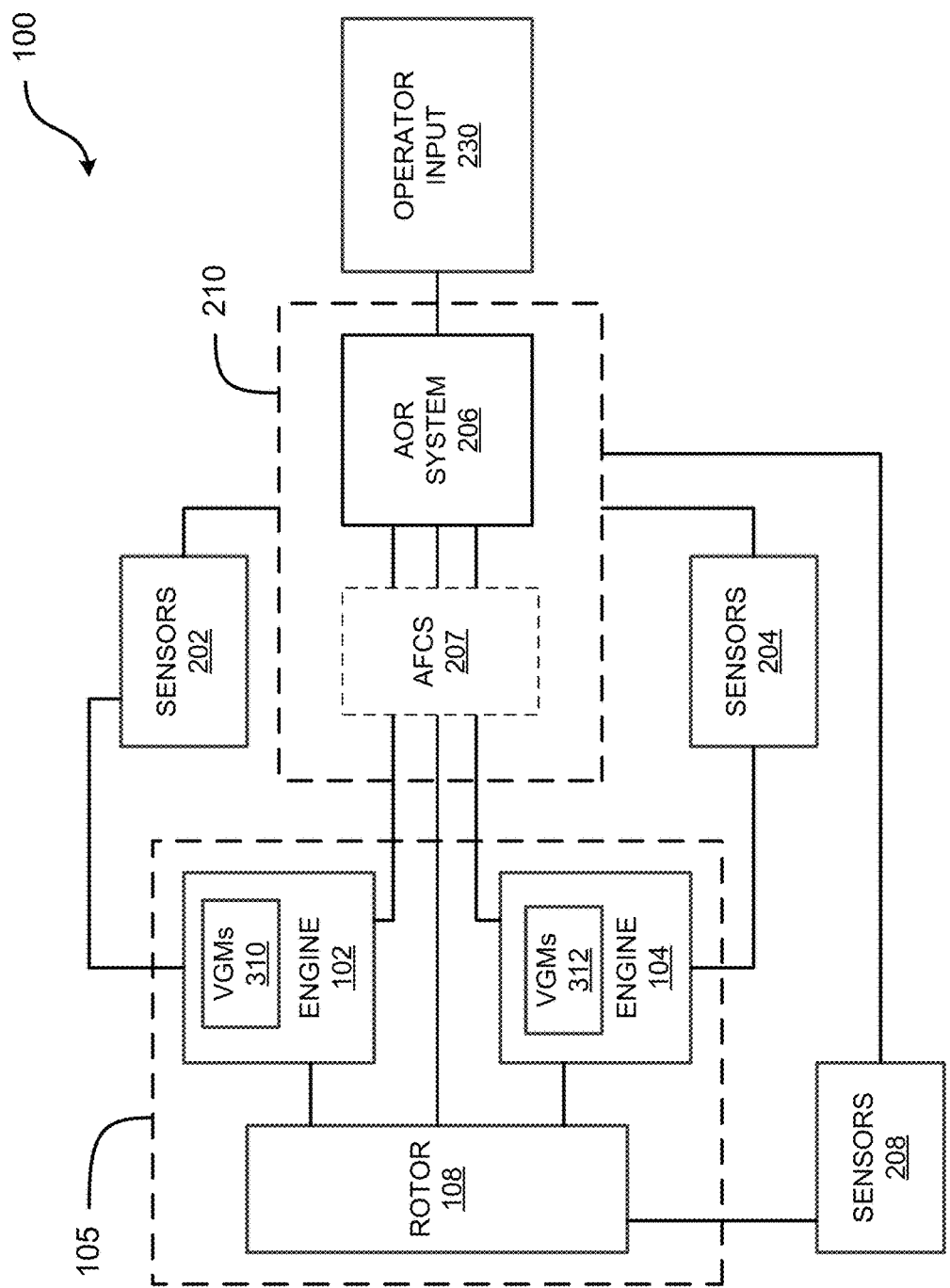
FIG. 3A is a block diagram of an example architecture for operating a multi-engine rotorcraft to shed ice accretion, in accordance with one embodiment.

The engine 102 may include one or more variable geometry mechanisms (VGMs, shown in FIG. 3A). In one embodiment, the VGMs comprise one or more variable inlet geometry mechanisms, e.g. a set of variable inlet guide vanes (VIGVs) moveable for directing air into each compressor section 12, 14 (e.g. compressor inlet guide vanes). For example, the VGMs may comprise low-pressure compressor inlet guide vanes, mid-pressure compressor inlet guide vanes, and/or high-pressure compressor inlet guide vanes. The low pressure compressor section 12 may include one or more variable guide vanes at its inlet or inter stage. The high pressure compressor section 14 may include one or more variable guide vanes at its inlet or inter stage. The set of VIGVs may direct the air to a first stage of the corresponding compressor section 12, 14. In operation, the set of VIGVs may efficiently and rapidly modulate the airflow and a power of the engine 102. It should however be understood that the VGMs may in some embodiments consist of outlet guide vanes for directing air out of the compressor sections 12, 14, variable stator vanes for directing incoming air into rotor blades (not shown) of the engine 102, variable nozzles, variable bleed-off valves, handling bleed-off valves (HBOVs), and the like.

The engine 102 may further include a transmission 38 driven by the low pressure shaft 32 and driving a rotatable output shaft 40. The transmission 38 may vary a ratio between rotational speeds of the low pressure shaft 32 and the output shaft 40.

Control of the operation of the engine 102 can be effected by one or more control systems, for example an engine controller 210. The engine controller 210 can modulate a fuel flow provided to the engine 102, the position and/or orientation of VGMs within the engine 102, a bleed level of the engine 102, and the like. In some embodiments, the engine controller 210 is configured for controlling operation of multiple engines, for instance the engines 102 and 104. For example, the engine controller 210 can be provided with one or more Full Authority Digital Engine Controllers (FADECs) or similar devices. Each FADEC can be assigned to control the operation of one or more of the engines 102, 104. Additionally, in some embodiments the engine controller 210 can be configured for controlling operation of other elements of the rotorcraft 100, for instance the main rotor 108.

With reference to FIG. 3A, the rotorcraft 100, comprising the engines 102, 104 and the rotor 108, is illustrated using a block diagram. More than two engines 102, 104 may be present on a same rotorcraft 100. The engines 102, 104 are mechanically coupled to the main rotor 108 via the transmission clutch system (TCS) 105, for instance as illustrated in FIG. 1B, for causing the rotor 108 to rotate and produce thrust for the rotorcraft 100. Although FIG. 3A illustrates a singular rotor 108, it should be noted that the rotorcraft 100 can include any number of rotors, including multiple main rotors, one or more tail rotors, and the like. Collectively, the engines 102, 104, and the rotor 108 form part of the multi-engine system 105, which is controlled by the engine controller 210. The engine controller 210 is configured for receiving various instructions from an operator of the rotorcraft 100, for example via operator input 230, which can include on or more flight control inputs, as described in greater detail herein below.

The multi-engine system 105 can be controlled by way of the engine controller 210, as described hereinabove. The engine controller 210 can be composed of various devices, including one or more FADEC, one or more rotor controllers, or any other suitable devices for controlling operation of the engines 102, 104, and/or the rotor 108. In some embodiments, the operation of the engines 102, 104, and of the rotor 108 is controlled by way of one or more actuators, mechanical linkages, hydraulic systems, and the like. The engine controller 210 can be coupled to the actuators, mechanical linkages, hydraulic systems, and the like, in any suitable fashion for effecting control of the engines 102, 104 and/or of the rotor 108. For example, if a change in the operating conditions of the rotorcraft 100 is detected without any corresponding change in inputs from an operator of the rotorcraft 100, the FADEC can adjust the inputs to compensate for the uncommanded change.

One or more sensors 202, 204 are coupled to the engines 102, 104, for acquiring data about the operating parameters of the engines 102, 104. Additionally, sensors 208 may be coupled to the rotor 108 for acquiring data about the operating parameters of the rotor 108. The sensors 202, 204, 208 may be any suitable type of sensor used to measure operating parameters such as but, not limited to, speed sensors, acceleration sensors, pressure sensors, temperature sensors, altitude sensors, and the like. The sensors 202, 204, 208, can be coupled to the engine controller 210 in any suitable fashion, including any suitable wired and/or wireless coupling techniques.

The engine controller 210 can be provided with an AOR system 206 which is configured to control operation of the engines 102, 104, and of the rotor 108, when the rotorcraft 100 is operating in the AOR. In certain embodiments, prior to entry into, or exit from, the AOR, various operating parameters for the engines 102, 104, and/or for the rotor 108, must be within predetermined bands and/or at, below, or above certain predetermined values. In some embodiments, when operating in the AOR, one of the engines, for example engine 102, is set as the so-called "active engine", and the other engine, in this example engine 104, is set as the so-called "standby engine" (also referred to as a "passive engine"). It should be noted that the association between engines 102, 104 and the active/standby status is solely for example purposes.

In some embodiments, the AOR system 206 effects changes in flight controls via an optional automatic flight control system (AFCS) 207 of the engine controller 210. The AFCS 207 can be configured for adjusting one or more inputs acquired from the operator input 230. The operator input 230 can include a collective lever input, a cyclic input, a pedal input, and/or any other suitable inputs for controlling operation of the rotorcraft 100. In some embodiments, the AFCS 207 can adjust the inputs by way of mechanical linkages, actuators, or the like, which adjust the position and/or orientation of various surfaces and mechanical machines. In other embodiments, the AFCS 207 can adjust analog or digital signals transmitted to actuators or other devices which control operation of the engines 102, 104, and/or of the rotor 108. Other approaches are also considered.

As described herein above, when operating in the AOR, the active engine (engine 102) and the standby engine (engine 104) are operated at different output power levels.

In the course of operation of the rotorcraft 100, an operator of the rotorcraft 100 can request that the rotorcraft enter the AOR for a flight segment. Alternatively, or in addition, the rotorcraft 100 can be configured to automatically attempt to enter the AOR for a flight segment under certain conditions, for instance based on a pre-established flight mission plan. Irrespective of whether entry into the AOR is commanded by an operator or occurs automatically, a decision is made (by the AOR system 206) regarding which of the engines 102, 104 will be set as the active engine, and which will be set as the standby engine. As used herein, a flight segment can refer to any flight mission, or any portion of any flight mission, and can be of any suitable length or duration, and can occur at any suitable time during a flight mission.

In one embodiment, when operating at low power for extended periods of time, the standby engine 104 may become de-coupled from the main transmission of the rotorcraft 100 through a clutch system (not shown). The VIGVs of the engine 104 may also be in a closed position with low mass flow to the engine 104. As can be appreciated, under these conditions, when the rotorcraft 100 is operating under cold weather, ice crystals (e.g., High Altitude Ice Crystals) or other types of ice may be encountered and accumulate on the engines 102, 104, leading to degraded engine performance, increased operating temperatures, potential engine/compressor surges, or even the inability to transition out of the standby mode if the VIGVs become immovable due to overly excessive build-up. In order to shed (i.e. remove or dislodge) ice accumulation or build-up (referred to herein as accretion), it is proposed herein to take one or more actions on the standby engine (e.g., engine 104), either in a single occurrence or periodically, as will be discussed further below. It should be understood that, as used herein, the term "ice" refers to water frozen into a solid state and includes, but is not limited to, rime ice, clear ice, ice pellets, hail, ice needles, snow, and other ice crystals.

Figure 3B:
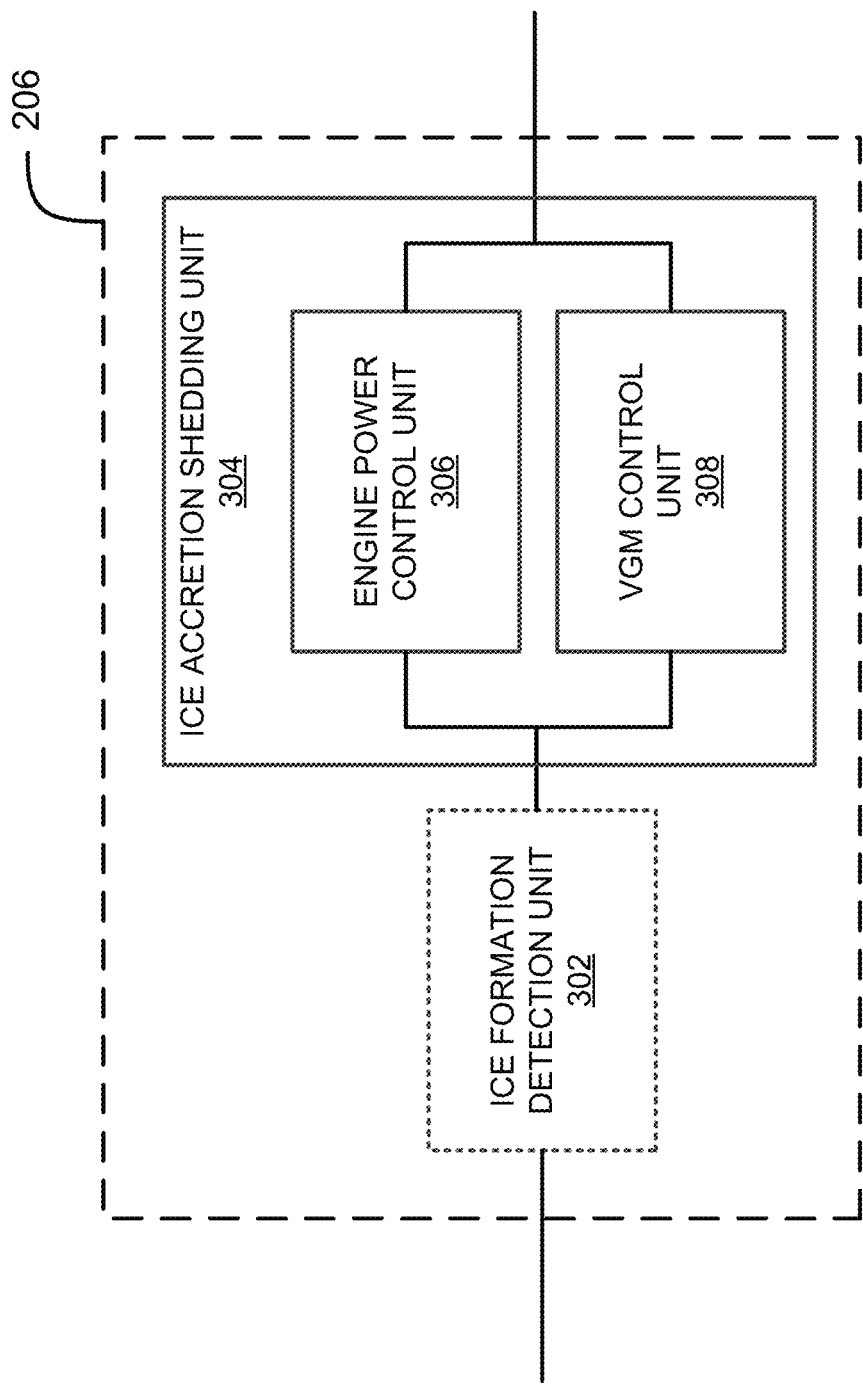
FIG. 3B is a block diagram of the asymmetric operating regime (AOR) system of FIG. 3A, in accordance with one embodiment.

Referring now to FIG. 3B in addition to FIG. 3A, in one embodiment, the AOR system 206 may comprise an ice formation detection unit 302 and an ice accretion shedding unit 304 comprising an engine power control unit 306 and a VGM control unit 308. Although the AOR system 206 is illustrated and described herein as comprising only units 302, 304, 306, and 308, this is for sake of clarity and it should be understood that the AOR system 206 may comprise additional units.

The ice formation detection unit 302 is configured to detect whether one or more operating (or flight) conditions are present in which ice formation or accumulation on the standby engine VGMs 312 is possible. For this purpose, the ice formation detection unit 302 receives from the sensors 202, 204, 208 input data and detects the operating condition(s) accordingly. The detection criteria may vary depending on the received input data.

In one embodiment, the sensors 202, 204, 208 may be configured to measure one or more operating parameters of the engines 102, 104, and/or 108, including, but not limited to, engine power (e.g. power of the active engine 102 and/or power of the standby engine 104), outside air temperature (e.g., inlet temperature of the active engine 102 and/or of the standby engine 104), altitude (or ambient pressure), airspeed, variable guide vane angle for engine 102 and/or engine 104, and any suitable parameter (such as engine mass flow, core corrected speed, or the like) that provides an indication (measured or assumed) of the amount of air going into the engines 102, 104, and/or 108. The ice formation detection unit 302 may then detect the operating condition(s) based on the received measurement data. For example, the ice formation detection unit 302 can detect that ice formation is possible if the outside air temperature is lower than a predetermined temperature threshold (e.g., five (5) degrees Celsius) below which icing is known to be possible.

In yet another embodiment, the sensors 202, 204, 208 may comprise one or more pressure sensors and the ice formation detection unit 302 may be configured to receive pressure measurement(s) from the sensors 202, 204, 208, compare the measurement(s) to predetermined pressure threshold(s), and detect the operating condition(s) responsive to determining that the measurement(s) exceed the threshold(s). It should be understood that the pressure threshold(s) may be any suitable threshold and may vary depending on engine configuration. For example, pressure measurement data may be received from one or more pressure differential sensors provided at any suitable location within the standby engine 104. The pressure differential sensor may be located at an inlet of the engine 104. More particularly, the pressure differential sensor may be located on a protection grid (not shown) provided at an inlet of the engine 104 and may be configured to measure a pressure differential at the protection grid. The pressure differential sensor may alternatively be located at the VGMs 312 and may be configured to measure pressure on either side of the VGMs 312. It should however be understood that the pressure measurement data may be received from one or more absolute pressure sensors provided at any suitable location within the engine 104. Absolute pressure measurement data may then be received from the absolute pressure sensor(s) and compared to the aircraft's ambient pressure. If the absolute pressure measurement is beyond a predetermined tolerance of the ambient pressure, the ice formation detection unit 302 may then detect that ice formation is possible. It should also be understood that, in another embodiment, the pressure measurement data may be received from one or more pressure sensors provided within the active engine 102. In this embodiment, the systems and methods herein may detect that the active engine 102 is under icing condition and therefore infer that the standby engine 104 is also in the same icing condition.

In another embodiment, the sensors 202, 204, 208 may comprise one or more icing sensors (or detectors) configured to sense the formation of ice on the rotorcraft 100. The ice formation detection unit 302 may accordingly detect the operating condition(s) based on the measurement data received from the icing sensor(s). As known to those skilled in the art, the icing sensor(s) may be provided at any suitable location on the rotorcraft 100 and may be embedded into the rotorcraft's weather system, altimeter, flight data recorder, stall warning indicator, or the like. In yet another embodiment, the ice formation detection unit 302 may detect the operating condition(s) on the basis of measurement data received from at least one thermodynamic indicator provided on the rotorcraft (e.g., through an on-board engine model of the rotorcraft's control system). For example, the turbine speeds of the engines 102, 104 being higher than expected for a given operating condition would indicate high restrictions or losses at the inlet of the engines 102, 104. Alternatively, the ice formation detection unit 302 may also detect the operating condition(s) based on input data acquired from operator input 230. For example, actuation of a suitable control in the cockpit may indicate that ice formation is possible. Other embodiments may apply.

Once the one or more operating conditions where ice formation is possible have been detected by the ice formation detection unit 302, the ice accretion shedding unit 304 may then be used to take one or more actions on the standby engine (e.g., engine 104) for shedding any ice accretion on the standby engine 104 (and particularly on the VGMs 312). It should be understood that, in some embodiments, the ice formation detection unit 302 is optional and the ice accretion shedding unit 304 may be used to shed any ice accretion on the standby engine, without previously determining whether operating condition(s) are present in which ice accumulation on the standby engine 104 is possible. In other words, the actions may be taken on the standby engine 104 as a preventive.

The actions are taken on the standby engine 104 in order to increase engine mass flow and comprise at least one increasing engine power and opening the VGMs (e.g., VGMs 312). These actions cause an increase in air velocity in the standby engine 104 and accordingly result in increased aerodynamic load on the ice accreted particles and in mechanical energy to shed the ice accretion. As will be discussed further below, it should be understood that level to which the engine mass flow is increased (e.g., the angle at which the VGMs 312 are opened) may vary depending on engine configurations. In one embodiment, the engine mass flow is increased (e.g., the VGMs are moved to a given opening angle) so as to achieve the desired ice accretion shedding. The mass flow (e.g., accordingly the opening angle) may be progressively increased until the desired result (i.e. removal of ice build-up) has been achieved (e.g., as detected by the ice accretion shedding unit 304).

At least one of the engine power control unit 306 and the VGM control unit 308 may accordingly be used to shed ice from the rotorcraft 100. The engine power control unit 306 may be used to control a power level of the engine 104. In one embodiment, the engine power control unit 306 may be configured to output to the engine 104 one or more control signals comprising instructions to adjust a fuel flow to the engine 104 in order to increase compressor speed and engine power and accordingly increase engine mass flow. The VGM control unit 308 may also be used to adjust the position of the VGMs 312. This may be achieved by generating and outputting, via the VGM control unit 308, one or more control signals to one or more actuators (not shown) of the engine 104, the actuators configured to control the position of the VGMs 312 accordingly.

Figure 4B:
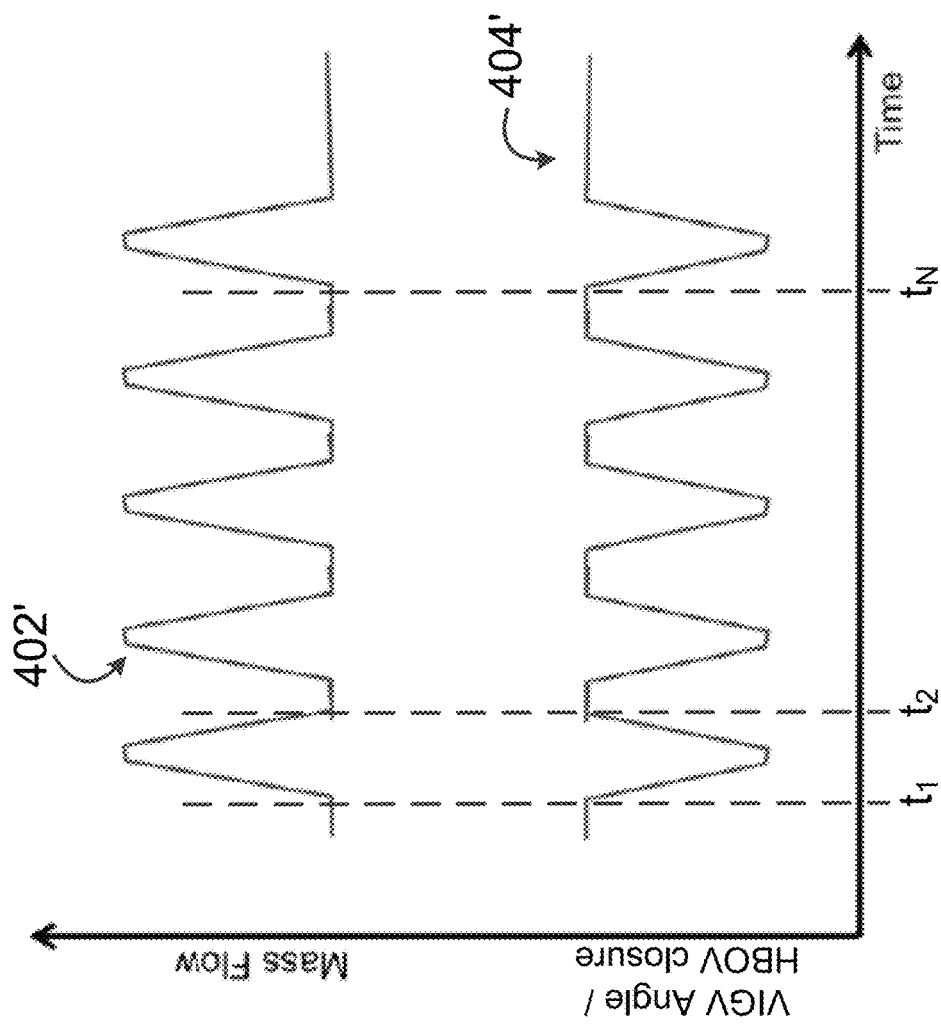
FIG. 4B is a graphical illustration of an example approach for operating a multi-engine rotorcraft to shed ice accretion, in accordance with another embodiment.
Figure 4A:
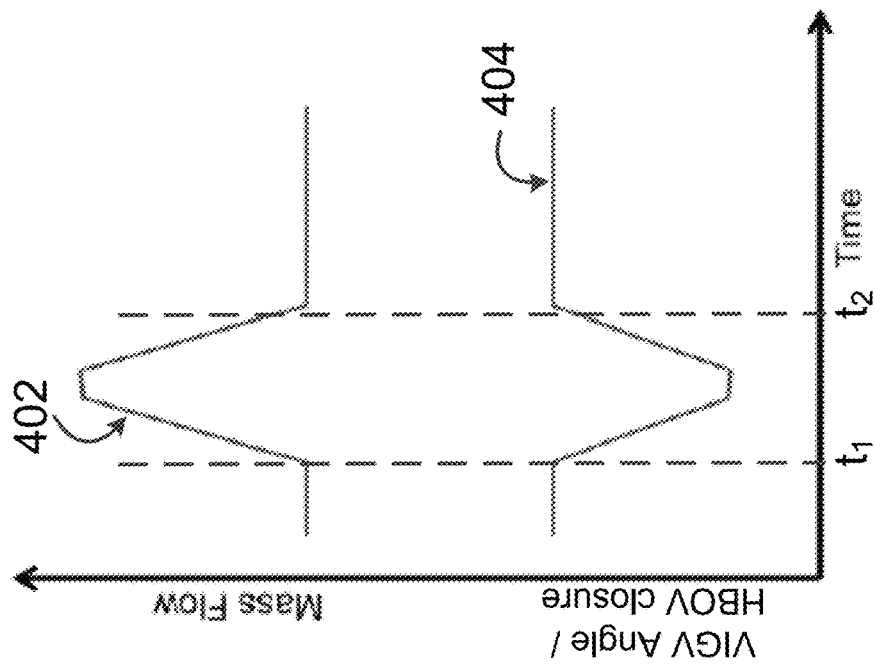
FIG. 4A is a graphical illustration of an example approach for operating a multi-engine rotorcraft to shed ice accretion, in accordance with one embodiment.

As discussed herein above and as illustrated in FIG. 4A, the action(s) taken on the standby engine 104 may be of a single occurrence. For example, the engine power may be increased once and the engine 104 may be brought back in standby mode. This is shown on plot 402, where the engine mass flow for engine 104 is increased at time $t_1$, and on plot 404 where the VIGV angle for engine 104 is decreased at time $t_1$. After the actions have been taken, the engine mass flow and the VIGV angle both return to their previous levels (i.e. their levels before at time $t_1$) at time $t_2$, indicating that the engine 104 is back to operating in standby mode. Alternatively and as illustrated in FIG. 4B, the action(s) taken on the standby engine 104 may be performed multiple times, with a predetermined period (also referred to herein as frequency). In this case, the period between each action on the standby engine 104 may depend on a number of parameters or conditions, such as the detection criteria described above, and may range from a few minutes to hours. As shown on plot 402', the engine mass flow for engine 104 can be increased periodically, at times $t_1, t_2, \ldots, t_N$, where N is an integer indicating the number of times the action is performed. Similarly and as shown on plot 404', the VIGV angle for engine 104 can be decreased periodically, at times $t_1, t_2, \ldots, t_N$. The number N of times the actions(s) are to be performed may be predetermined and may depend on engine configuration. In one embodiment, it may be desirable to limit the number N in order to save fuel. After the engine mass flow and the VIGV angle have been varied N times, the engine 104 returns to the standby mode.

As described herein above, the VGMs may comprise HBOVs provided on the standby engine 104. As understood by those skilled in the art, an HBOV typically consists of a coaxial shutoff valve that controls the inflow of bleed air from the engine into other aircraft systems. HBOVs may be used for engine starting, transient bleed, and surge control of the bleed air and are generally designed for 10% to 30% mass flow. During operation, HBOVs are generally either fully open or fully closed and solenoids managed by the EEC may be used to pneumatically control whether an HBOV is in an open or closed position. In order to increase engine mass flow and shed ice formation, it is proposed herein to use the VGM control unit 308 to adjust the HBOV position. In particular, the engine 104 may be operated with the HBOVs in a closed position and the VGM control unit 308 may cause (e.g., at time $t_1$ in FIG. 4A) the HBOVs to be moved to the open position in order to increase mass flow and shed accreted ice. The VGM control unit 308 may then return (e.g., at time $t_2$ in FIG. 4A) the HBOVs to the closed position. This action may be performed periodically, such that the HBOVs may be opened once in a while (e.g. at times $t_1, t_2, \ldots, t_N$ in FIG. 4B) to increase mass flow and shed ice formation).

It should be understood that, in addition to varying the period of the actions to be performed on the standby engine 104, the amplitude of the actions (i.e. the level to which the engine power is increased and the angle at which the VGMs 312 are opened to increase engine mass flow to a given level) may also vary, depending on operating conditions, thermodynamic indicators, and the like. As discussed above, the amplitude of the actions is set so as to achieve the desired shedding of ice accretion. The ice accretion shedding unit 304 may be configured to query a look-up table (stored in memory or any suitable data storage device) in order to determine a frequency and an amplitude of the action(s) to be taken.

Although the systems and methods described herein may be used to shed ice accretion from the standby engine VGMs 312, it should be understood that they may also be used to shed ice accretion from the standby engine's protection grid as well.

In one embodiment, the engine power increase commanded by the engine power control unit 306 may be such that the standby engine 104 could end-up re-coupling to the main transmission (not shown) of the rotorcraft 100 and start providing some of the power required by the rotorcraft 100. A power increase ranging from standby power level to active power level may therefore be experienced by the standby engine 104. If this is the case, the AOR system 206 may be used to control the active engine 102 in such a way to react to the increase in power level and maintain the same constant total power to the rotorcraft 100. This may be achieved by decreasing the power level of the active engine 102 by substantially the same amount by which the power level of the standby engine 104 is increased. For example, the power level of the standby engine 104 may be increased to the active power level and the power level of the active engine 102 reduced to standby power level, thereby maintaining constant total power to the rotorcraft 100. The engines 102, 104 may then be alternated between the standby and active mode of operation at any frequency suitable to maintain acceptable aircraft performance in icing conditions. Ice accretion may be accordingly shed from the engines 102, 104 sequentially and ice accretion may even be shed from both engines 102, 104 simultaneously, provided bi-literal communication (e.g., synchronization) between the engines 102, 104 is implemented. As previously discussed, the systems and methods described herein may accordingly be applicable to aircraft having more than two (2) engines. For example, for aircraft with three engines, a power level of first one of the engines may be increased to shed ice accretion from this first engine, while the power level of the remaining two engines is decreased accordingly. In this case, the power level of each of the two remaining engines would be substantially equal to half of the power level of the first engine. Other embodiments may apply.

Figure 5:
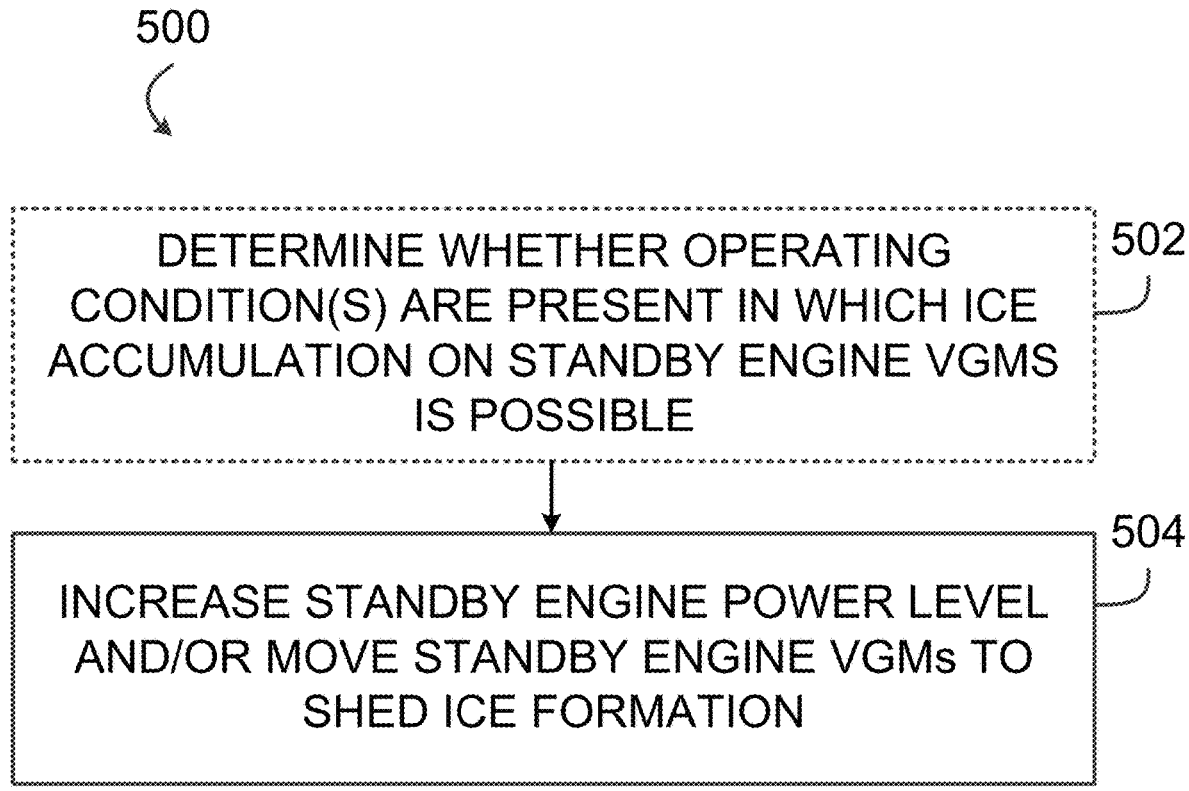
FIG. 5 is a flowchart of an example method for operating a multi-engine rotorcraft to shed ice accretion, in accordance with one embodiment.

With reference to FIG. 5, there is shown a flowchart illustrating a method 500 for operating a multi-engine aircraft, for example the rotorcraft 100 of FIG. 1A, for shedding ice accretion, in accordance with one embodiment. In some embodiments, the rotorcraft 100 is a helicopter.

The method 500 may comprise detecting, at step 502, whether operating condition(s) are present in which ice accumulation on the standby engine VGMs is possible. For this purpose, step 502 may comprise detecting at least one operating condition in which ice formation is possible on the basis of at least one operating parameter including, but not limited to, at least one of engine power, outside air temperature, engine inlet temperature, altitude, ambient pressure, airspeed, variable guide vane angle, engine mass flow, and core corrected speed. The operating condition may also be detected at step 502 based on measurement data received from at least one icing sensor provided on the rotorcraft 100. In another embodiment, step 502 may comprise detecting the operating condition on the basis of measurement data received from at least one thermodynamic indicator provided through an on-board engine model in a control system of the rotorcraft 100. Alternatively, the operating condition may be detected on the basis of operator input.

In yet another embodiment, step 502 comprises receiving measurement data from at least one pressure sensor provided on the rotorcraft 100, comparing the measurement data to a predetermined threshold, and detecting the operating condition responsive to determining that the measurement data exceeds the threshold. The at least one pressure sensor may comprise a pressure differential sensor configured to measure pressure at a protection grid provided at an inlet of the standby engine (e.g., engine 104). The at least one pressure sensor may also comprise a pressure differential sensor configured to measure pressure on either side of VIGVs of the standby engine 104.

At step 504, responsive to detecting at least one operating condition in which ice formation is possible, the power level of the standby engine 104 is increased and/or the VGMs of the standby engine 104 are moved to shed the ice accretion. As discussed above, it should be understood that step 502 may be optional and step 504 may be performed without having previously determined whether operating condition(s) are present in which ice accumulation on the standby engine 104 is possible. As also discussed above, the engine power level may be increased by increasing a fuel flow to the standby engine and accordingly compressor speed, thereby increasing engine mass flow. The VGMs may be moved by increasing an angle of (i.e. opening) the VIGVs or the HBOVs of the standby engine. The power level and/or the VGMs of the standby engine may be adjusted periodically or in a single occurrence.

In some embodiments, the method 500 is performed by the FADEC of the rotorcraft 100, or any other suitable engine electronic controller, which can implement part or all of the engine controller 210. In some embodiments, a portion of the method 500 is performed by the FADEC or other suitable engine electronic controller.

Figure 6:
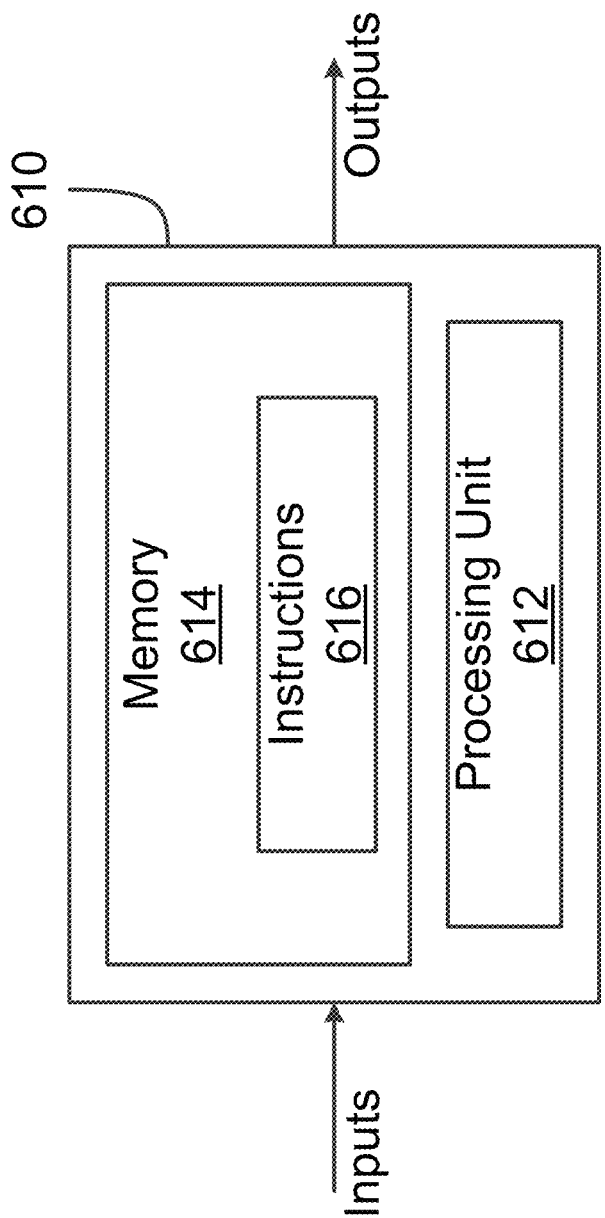
FIG. 6 is a block diagram of an example computing device for implementing the method of FIG. 5, in accordance with one embodiment.

With reference to FIG. 6, the method 500 may be implemented by a computing device 610, which can embody part or all of the engine controller 210, the AOR system 206, and/or the AFCS system 207. The computing device 610 comprises a processing unit 612 and a memory 614 which has stored therein computer-executable instructions 616. The processing unit 612 may comprise any suitable devices configured to implement the functionality of the AOR system 206 and/or the functionality described in the method 500, such that instructions 616, when executed by the computing device 610 or other programmable apparatus, may cause the functions/acts/steps performed by the AOR system 206 and/or described in the method 500 as provided herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612.

The methods and systems for operating a multi-engine rotorcraft as described herein may be implemented in a high level procedural or object oriented programming or scripting language, or a combination thereof, to communicate with or assist in the operation of a computer system, for example the computing device 610. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 612 of the computing device 610, to operate in a specific and pre-defined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating a multi-engine rotorcraft, the method comprising:
when the rotorcraft is cruising in an asymmetric operating regime (AOR) in which at least one engine is an active engine and is operated in an active mode to provide motive power to the rotorcraft and at least one second engine is a standby engine and is operated in a standby mode to provide substantially no motive power to the rotorcraft, at least one of increasing a power level of the at least one second engine and moving at least one variable geometry mechanism of the at least one second engine to shed any ice accumulation on the at least one second engine.

2. The method of claim 1, further comprising determining whether one or more conditions are present in which the ice accumulation on the at least one second engine is possible.

3. The method of claim 2, wherein determining whether the one or more conditions are present is performed on the basis of outside air temperature.

4. The method of claim 3, wherein determining whether the one or more conditions are present is further performed on the basis of at least one of a power level of the at least one second engine, a temperature at an inlet of the at least one second engine, an angle of at least one variable guide of the at least one second engine, a mass flow of the at least one second engine, a core corrected speed of the at least one second engine, ambient pressure, airspeed, and an altitude of the rotorcraft.

5. The method of claim 2, wherein determining whether the one or more conditions are present is performed on the basis of measurement data received from at least one icing sensor provided on the rotorcraft.

6. The method of claim 2, wherein determining whether the one or more conditions are present comprises:
receiving measurement data from at least one pressure sensor provided on the at least one second engine;
comparing the measurement data to a predetermined threshold; and
responsive to determining that the measurement data exceeds the threshold, determining that the ice accumulation is possible.

7. The method of claim 6, wherein determining whether the one or more conditions are present is performed on the basis of measurement data received from a pressure differential sensor configured to measure pressure at a protection grid provided at an inlet of the second engine.

8. The method of claim 6, wherein determining whether the one or more conditions are present is performed on the basis of measurement data received from a pressure differential sensor configured to measure pressure on either side of a plurality of inlet guide vanes of the second engine.

9. The method of claim 2, wherein determining whether the one or more conditions are present is performed on the basis of input data received from at least one thermodynamic indicator provided on the rotorcraft.

10. The method of claim 2, wherein determining whether the one or more conditions are present is performed on the basis of input data acquired from at least one operator input.

11. The method of claim 1, wherein increasing the power level of the at least one second engine comprises increasing a fuel flow to the at least one second engine.

12. The method of claim 1, wherein moving the at least one variable geometry mechanism of the at least one second engine comprises opening a plurality of variable inlet guide vanes of the at least one second engine.

13. The method of claim 1, wherein moving the at least one variable geometry mechanism of the at least one second engine comprises opening a plurality of handling bleed-off valves of the at least one second engine.

14. The method of claim 1, wherein the at least one of increasing the power level of the at least one second engine and moving the at least one variable geometry mechanism of the at least one second engine is performed periodically.

15. The method of claim 1, wherein the at least one of increasing the power level of the at least one second engine and moving the at least one variable geometry mechanism of the at least one second engine is performed in a single occurrence.

16. A system for operating a multi-engine rotorcraft, comprising:
a processing unit; and
a non-transitory computer-readable medium having stored thereon program instructions executable by the processing unit for:
when the rotorcraft is cruising in an asymmetric operating regime (AOR) at least one engine is an active engine and is operated in an active mode to provide motive power to the rotorcraft and at least one second engine is a standby engine and is operated in a standby mode to provide substantially no motive power to the rotorcraft, at least one of increasing a power level of the at least one second engine and moving at least one variable geometry mechanism of the at least one second engine to shed any ice accumulation on the at least one second engine.

17. The system of claim 16, wherein the program instructions are executable by the processing unit for determining whether one or more conditions are present in which the ice accumulation on the at least one second engine is possible.

18. The system of claim 17, wherein the program instructions are executable by the processing unit for determining whether the one or more conditions are present on the basis of outside air temperature.

19. The system of claim 18, wherein the program instructions are executable by the processing unit for determining whether the one or more conditions are present on the basis of at least one of a power level of the at least one second engine, an inlet temperature of the at least one second engine, an angle of at least one variable guide of the at least one second engine, a mass flow of the at least one second engine, a core corrected speed of the at least one second engine, ambient pressure, airspeed, and an altitude of the rotorcraft.

20. The system of claim 17, wherein the program instructions are executable by the processing unit for determining whether the one or more conditions are present comprising:
receiving measurement data from a pressure differential sensor provided on the at least one second engine, the pressure differential sensor configured to measure pressure on either side of a plurality of inlet guide vanes of the second engine;
comparing the measurement data to a predetermined threshold; and
responsive to determining that the measurement data exceeds the threshold, determining that the ice accumulation is possible.

21. The system of claim 17, wherein the program instructions are executable by the processing unit for determining whether the one or more conditions are present comprising:
receiving measurement data from a pressure differential sensor provided on the at least one second engine, the pressure differential sensor configured to measure pressure at a protection grid provided at an inlet of the second engine;
comparing the measurement data to a predetermined threshold; and
responsive to determining that the measurement data exceeds the threshold, determining that the ice accumulation is possible.

22. The system of claim 16, wherein the program instructions are executable by the processing unit for outputting at least one control signal comprising instructions for at least one of increasing a fuel flow to the at least one second engine to increase the power level of the at least one second engine and opening a plurality of variable inlet guide vanes of the at least one second engine.

* * * * *